Dec. 12, 1933.   A. F. MASURY   1,938,847
TORSIONAL SPRING SUSPENSION FOR INDIVIDUALLY SPRUNG WHEELS
Filed June 17, 1932   3 Sheets-Sheet 1
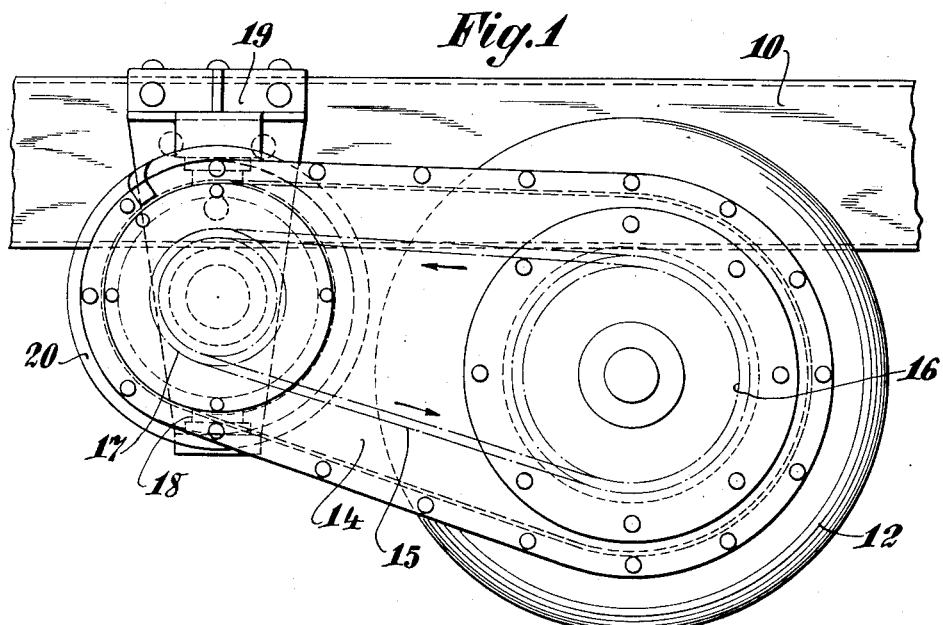
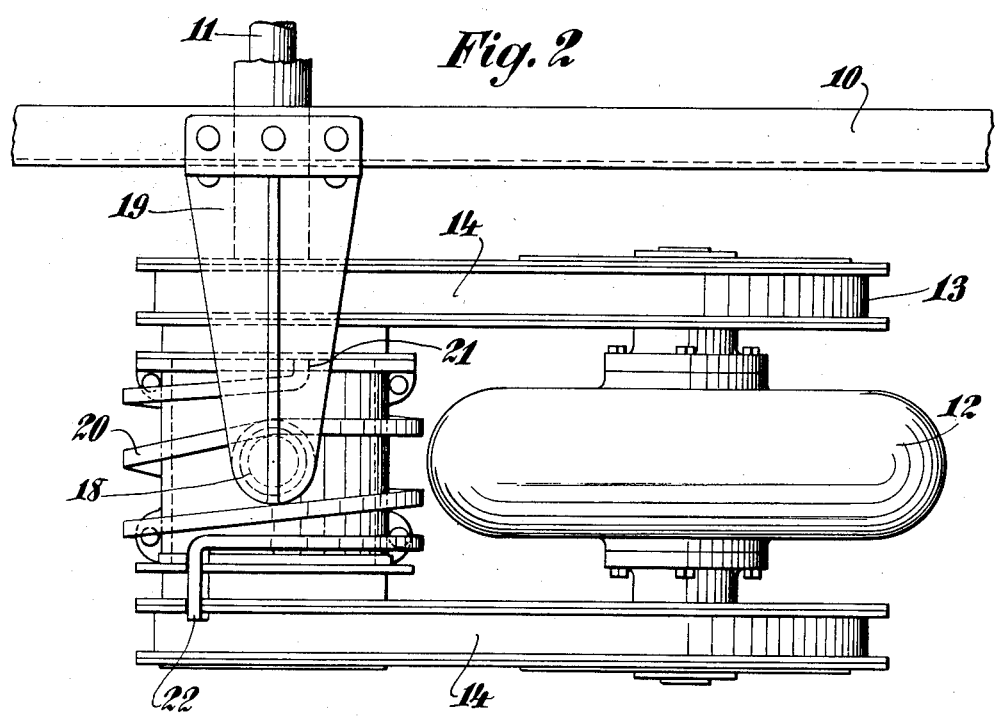
INVENTOR
Alfred F. Masury,
BY
Redding, Greeley, O'Shea & Campbell
HIS ATTORNEYS Dec. 12, 1933.  A. F. MASURY  1,938,847
TORSIONAL SPRING SUSPENSION FOR INDIVIDUALLY SPRUNG WHEELS
Filed June 17, 1932  3 Sheets-Sheet 2

INVENTOR
Alfred F. Masury,
BY Redding, Greeley, O'Shea & Campbell
HIS ATTORNEYS

Dec. 12, 1933.　　　　A. F. MASURY　　　　1,938,847
TORSIONAL SPRING SUSPENSION FOR INDIVIDUALLY SPRUNG WHEELS
Filed June 17, 1932　　　3 Sheets-Sheet 3

INVENTOR
Alfred F. Masury,
BY Redding, Greeley, O'Shea & Campbell
HIS ATTORNEYS

Patented Dec. 12, 1933

1,938,847

UNITED STATES PATENT OFFICE 1,938,847

TORSIONAL SPRING SUSPENSION FOR INDIVIDUALLY SPRUNG WHEELS

Alfred F. Masury, New York, N. Y., assignor to International Motor Company, New York, N. Y., a corporation of Delaware Application June 17, 1932. Serial No. 617,752

2 Claims. (Cl. 180—72)

The present invention relates to independently mounted wheels for motor vehicles and embodies, more specifically, an improved independently mounted wheel structure by means of which the vehicle load is supported upon an independently mounted wheel with provision for relative movement of the wheel with respect to the frame of the vehicle not only in a vertical plane but in horizontal planes without destroying the effective nature of the spring mounting of the wheel. The invention further relates to drives for individually mounted wheels wherein independently mounted wheels are now commonly known and various constructions have been provided whereby such wheels may not only be driven but also support the vehicle load. Where more than two wheels are provided at each end of a vehicle frame, effective steering of the vehicle requires that the wheels have provision for relative movement with respect to the frame in horizontal planes, thus enabling the wheels to track without offering too much resistance to the turning of the vehicle about corners.

An object of the invention, accordingly, is to provide a wheel mounting for an independently mounted wheel, wherein the wheel is not only spring mounted for movement in a vertical plane but also is capable of partaking of a degree of horizontal movement with respect to the frame, thus permitting the wheel to track effectively when the vehicle is rounding a corner.

Further objects, not specifically enumerated above, will be apparent as the invention is described in greater detail in connection with the accompanying drawings, wherein:

Figure 1 is a view in side elevation, showing a mounting for an independently mounted wheel constructed in accordance with the present invention.

Figure 2 is a plan view of the mounting of Figure 1.

Figure 3:
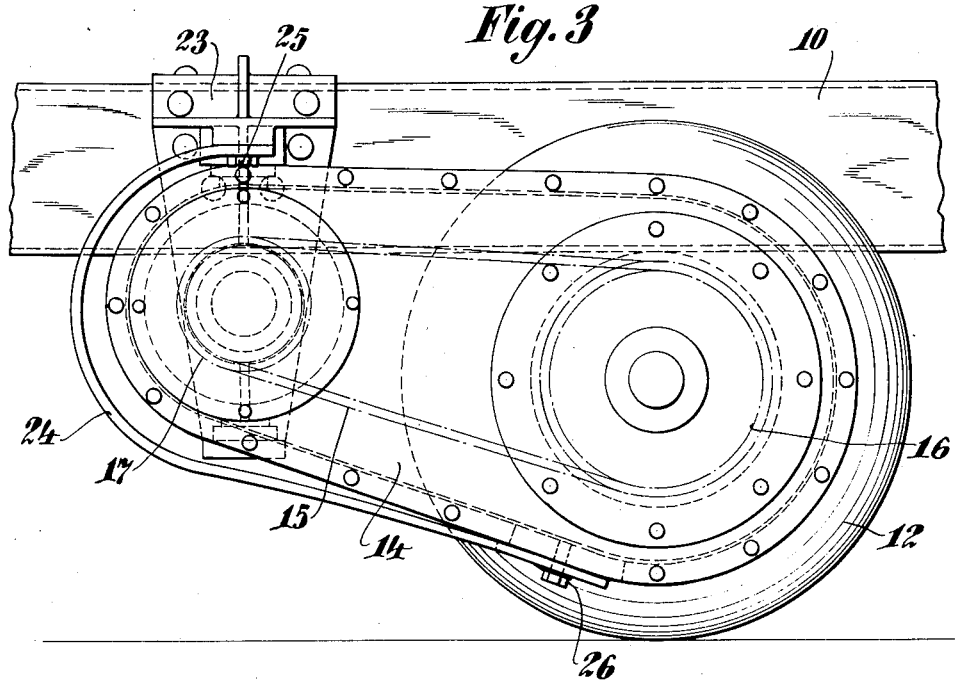
Figure 3 is a view similar to Figure 1, showing a modified form of mounting.

With reference to the above drawings, a vehicle frame is shown at 10 and is provided with a drive shaft 11 and a wheel 12. Wheel 12 is mounted upon a fork-shaped mounting element 13, being mounted between parallel arms 14 thereof and driven by means of chains 15 in each arm, a driven sprocket 16 and driving sprocket 17 being provided in the ends of each arm 14 to afford a driving connection for the wheel 12.

Power is transmitted to the driven sprockets 16 through chains 15 by motion of the chains in the direction designated by the arrows in Figure 1, the upper stretches of the chains being under tension while the lower stretches are slack. This construction enables the wheel to effectively negotiate irregularities in the road surface and cause the load center of the frame to shift upwardly and forwardly of the irregularity engaged by the wheel to enable the latter to mount the irregularity more readily.

In order that wheel 12 may move in horizontal planes with respect to the frame 10, the mounting 13 is swiveled upon a vertical axis 18 in a bracket 19 which is secured to the vehicle frame. A spring 20 is coiled about the axis of shaft 11 and anchored at an end 21 thereof to the bracket 19, the other end of the spring being connected to the mounting structure 13, as indicated at 22. Spring 20 thus not only serves to cushion the load effectively upon the wheel 12 but permits a degree of movement of wheel 12 in horizontal planes with respect to frame 10.

Figure 4:
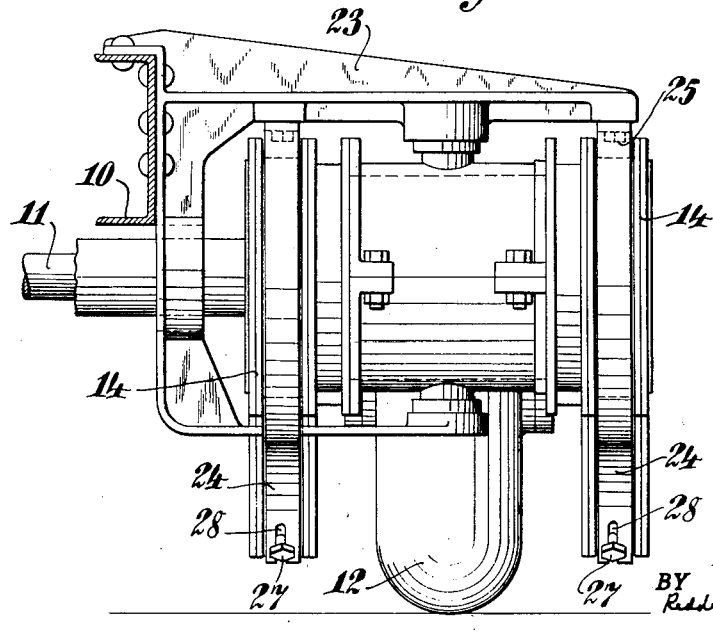
Figure 4 is a view in end elevation, looking from the left in Figure 3.

In the construction shown in Figures 3 and 4, the wheel 12 is mounted upon frame 10 and driven in the manner described in connection with the construction shown in Figures 1 and 2. A bracket 23 is secured to the frame 10 and serves as an anchorage for the ends of springs 24 which are secured thereto at 25. Springs 24 are wound under tension and secured to the undersides of arms 14, as indicated at 26. The tendency of the springs 24 to unwind serves to support the frame effectively upon the wheel in the desired fashion. Each connection 26 includes a retaining bolt 27 which bolts engage slots 28 formed in the respective springs 24 to permit a predetermined movement between the spring and supporting arm 14 and a suitable limiting device may be provided, if desired, to prevent the spring 24 from being disconnected from the respective bolt 27.

Figure 5:
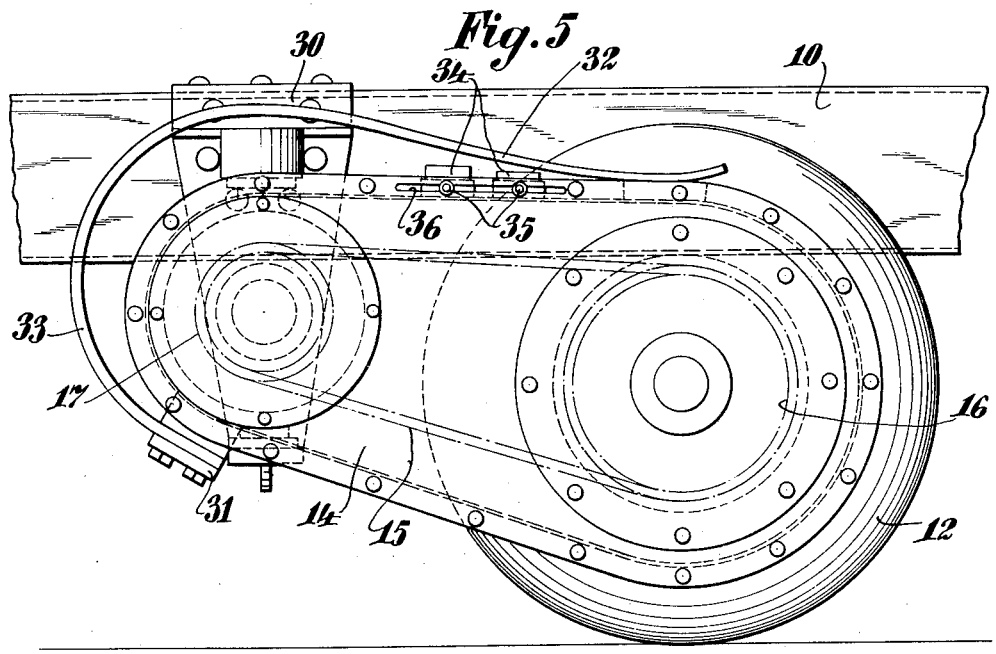
Figure 5 is a view similar to Figure 1, showing a further modification of the invention.
Figure 6:
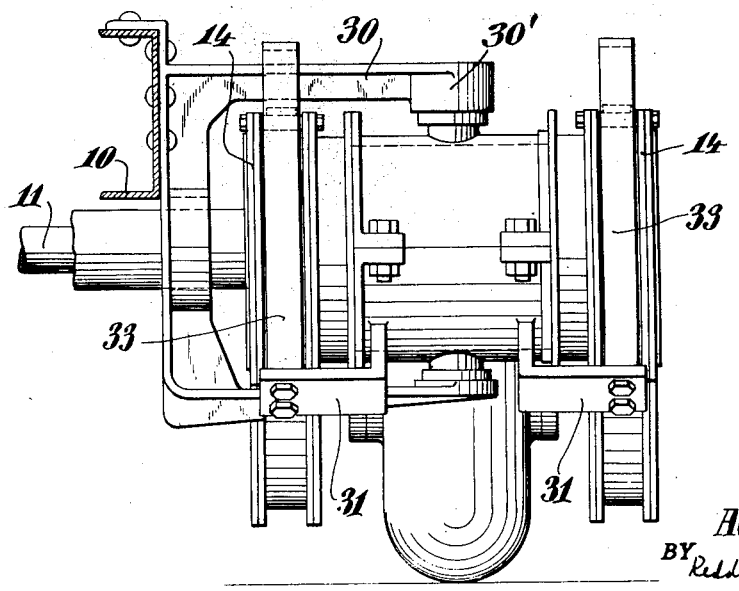
Figure 6 is a view in end elevation taken from the left in Figure 5.

In the construction shown in Figures 5 and 6, a bracket 30 upon the frame 10 journals a bearing member 30' in which arms 14 are journaled and which is provided with a plurality of offset arms 31 upon which leaf springs 32 are anchored. The springs 32 are formed with snarls 33, the ends of which are anchored upon the arms 31 and the ends of the springs 32 engage upon the tops of the arms 14. Beneath the springs 32, upon the tops of the arms 14, are adjustable bearing pads 34 which are provided with securing means 35 adapted to engage slots 36 in the respective arms to vary the positions of the bearing pads. In this fashion the progressive action of the springs may be varied to vary the effective lengths thereof under predetermined load conditions.

It will thus be seen that a construction has been provided for effectively mounting independent wheels upon a vehicle frame in such fashion as to permit a limited movement thereof in horizontal planes with respect to centering the wheels in a desired position in order that the wheels may track under all conditions of operation.

While the invention has been described with specific reference to the accompanying drawings, it is not to be limited, save as defined in the appended claims.

I claim as my invention:

1. In combination with a vehicle frame and an individually mounted driving wheel thereon mounted by means of a bracket on the frame and an arm journaled on the bracket and mounting the wheel thereon, the mounting including means on the frame and passing within the arm for driving the wheel, a spring suspension for the wheel comprising a torsional spring between the bracket and arm to support the frame on the wheel, said spring being formed of a plurality of coils concentric with the axis of the journal of the arm on the bracket and anchored at its ends on the arm and bracket, respectively.

2. In combination with a vehicle frame and an individually mounted driving wheel thereon mounted by means of a U-shaped bracket on the frame lying in a vertical plane and an arm journaled on the bracket and mounting the wheel thereon, said arm being journaled on the bracket for movement about horizontal and vertical axes, the mounting including means on the frame and passing within the arm for driving the wheel, a spring suspension for the wheel comprising a torsional spring between the bracket and arm to support the frame on the wheel, said spring being formed of a plurality of coils concentric with the axis of the journal of the arm on the bracket and anchored at its ends on the arm and bracket, respectively.

ALFRED F. MASURY.